June 12, 1962 W. BRADY 3,038,748
ACTUATING MECHANISMS FOR VEHICLE DOOR FASTENINGS
Filed June 22, 1960

Inventor
W. Brady
By Glascock Downing Seebohm
Attys.

United States Patent Office 3,038,748
Patented June 12, 1962

3,038,748
ACTUATING MECHANISMS FOR VEHICLE DOOR FASTENINGS
William Brady, Edgbaston, Birmingham, England, assignor to Wilmot-Breeden Limited, Birmingham, England
Filed June 22, 1960, Ser. No. 37,983
Claims priority, application Great Britain July 9, 1959
2 Claims. (Cl. 292—336.3)

This invention relates to an actuating mechanism for a vehicle door fastening of the kind which is operable manually from the inside of the door to effect release or locking of the fastening.

The object of the present invention is to provide a new or improved construction.

An actuating mechanism in accordance with the present invention comprises a body part adapted to be mounted on the door of a vehicle and an operating lever which is pivotally mounted on the body part and which is adapted to be connected to the door fastening, said operating lever having an abutment and the mechanism being provided with resilient means which are deformable by said abutment when the operating lever is pivoted in one direction to release the door fastening, said resilient means then acting to urge the operating lever back towards its initial position, there being also provided a locking lever which is pivotally mounted on the body part, said locking lever and operating lever being adapted to co-act with each other when the operating lever is pivoted in a direction opposite to said first mentioned direction in order to retain the operating lever in a locked position to lock the door fastening, said locking lever being resiliently urged into engagement with the operating lever in the locked position of the latter.

Preferably, the resilient means which is deformable by the abutment of the operating lever may also be adapted to act on the locking lever and said resilient means may be in the form of a coil spring which is located in the body part and which extends between the abutment of the operating lever and the locking lever. Thus, the locking lever may be pivoted about a point disposed intermediate its ends and one end may be provided with a projection or nose adapted to compress the coil spring. The other end of the locking lever may then have a recess or projection adapted to engage a projection or recess respectively of the operating lever in order to retain the latter in the locked position.

Figure 1:
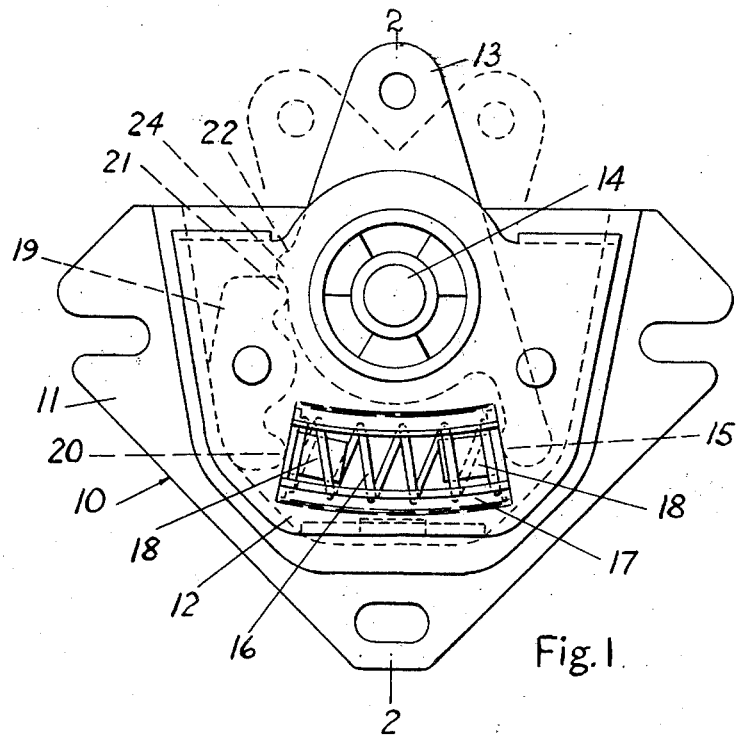
Figure 2:
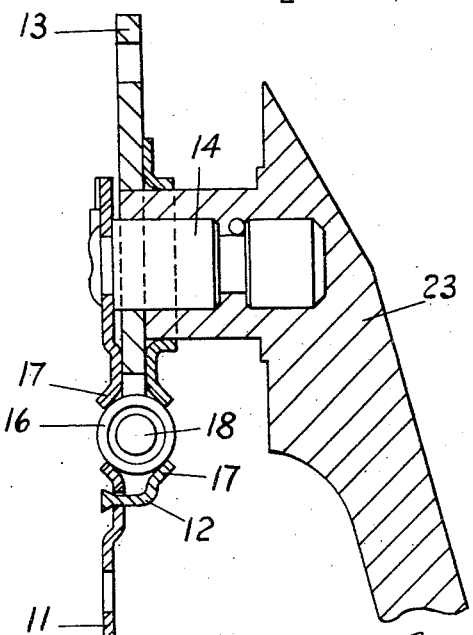

The invention is now more particularly described with reference to the accompanying drawings wherein:

FIGURES 1 and 2 are respectively a side elevation and a sectional view taken on the line 2—2 of FIGURE 1, FIGURE 2 including in addition an operating handle.

Referring to the drawings, the actuating mechanism shown therein is provided with a body part 10 which is formed from two plates 11 and 12 spaced apart from each other over the greater part of their areas and secured together in any convenient manner. The body part is adapted to be mounted in a vehicle door and within the hollow interior of said body part 10 is mounted an operating lever 13 mounted on a spindle 14 so that said lever 13 can pivot relative to the body part.

One end of said operating lever projects outwardly beyond the body part and is adapted to be connected to the door fastening by any suitable linkage (not shown). The opposite end of said operating lever is disposed within the hollow interior of the body part and is provided with an abutment 15 which is formed by one side of a tongue provided at the end of said operating lever.

There is also provided resilient means in the form of a coil spring 16 which is mounted in the body part.

The diameter of the spring is somewhat greater than the distance separating the two plates forming the body part, and said plates are formed with apertures or recesses so as to accommodate the spring in the body part, ears or flanges 17 being formed as shown to locate the spring. The spring 16 is provided at each end with a stud 18 having at its outer end a flange which has a diameter equal to or slightly greater than the diameter of the spring so that each of said flanges extends across the width of the body part and provides further location for the spring.

There is also provided a locking lever 19 which is pivotally mounted within the hollow body part, said locking lever being pivoted at a position intermediate its ends. One end 20 of the locking lever is formed with a nose or projection adapted to engage one of the stud flanges previously referred to, the other stud flange being adapted to be engaged by the abutment 15 of the operating lever. The opposite end of the locking lever is provided with the projection 21 (or recess) and the adjacent part of the operating lever is provided with a co-acting recess 22 (or projection), the arrangement being that rotation of the operating lever in one direction will have a cam-like action on the locking lever so that the co-acting recess and projection are engaged.

The spindle 14 on which the operating lever 13 is mounted projects at one end through the body part and on the projecting end is mounted a handle 23 (see FIGURE 2) so that rotation of the handle will result in turning of the operating lever. When the operating lever 13 is turned in one direction the abutment 15 will move towards the centre of the coil spring 16 so as to engage the adjacent stud flange and compress the spring. This movement will serve (through the associated linkage) to release the door fastening and the compressed spring will apply a restoring force to the operating lever when the handle is released. During this movement the locking lever 19 will be ineffective.

On the other hand, if the operating lever is turned in the opposite direction the aforementioned abutment 15 will move away from the spring 16 whereas a cam 24 on the operating lever 13 will engage the adjacent end of the locking lever 19 so as to cause the opposite end 20 to engage the adjacent stud flange and exert a slight compression on the spring 16. Continued movement of the operating lever in this direction will cause the aforementioned co-acting projection 21 and recess 22 to engage each other so that the operating lever 13 is retained in a position in which the door fastening is in a locked condition, the locking being effected by the linkage connecting the operating lever to the door fastening. The door fastening can of course be unlocked by turning the operating lever in the reverse direction.

In an alternative construction (not shown) the body part and the operating lever may each be formed from a single piece of metal bent to U-shaped configuration with one limb of the operating lever projecting into the space between the two limbs of the body part.

Having thus described my invention what I claim as new and desire to secure by Letters Patent is:

1. Mechanism for actuating a vehicle door fastening from the inner side of the door, comprising in combination a body part adapted to be attached to the door, an operating lever pivotally mounted at a position intermediate its ends on said body part and adapted at one end to be connected to the door fastening, an abutment integral with the other end of said operating lever, a manually operable handle coupled to said operating lever, a locking lever pivotally mounted at a position intermediate its ends on said body part and adapted at one end to co-operate with a complementary part of said operating lever for retaining the latter in a position in which the door fastening is locked, and into which said operating lever is movable in one direction by said handle, a helical compression spring carried by said body part, and disposed between the other end of said locking lever and the abutment on said operating lever so that movement of the latter in the opposite direction by said handle, to release the door fastening, causes the abutment on said operating lever to compress said spring which effects return movement of said operating lever when said handle is subsequently released, and a non-rotatable spindle which is secured to said body part, and on which said operating lever and said handle are rotatably supported.

2. Mechanism according to claim 1, wherein said helical compression spring is provided at opposite ends respectively with a pair of studs for contact respectively with the adjacent end of said locking lever and the abutment on said operating lever.

References Cited in the file of this patent

UNITED STATES PATENTS

| | | |
|---|---|---|
| 2,674,448 | Marple | Apr. 6, 1954 |
| 2,684,263 | McKay | July 20, 1954 |

FOREIGN PATENTS

| | | |
|---|---|---|
| 708,303 | Great Britain | May 5, 1954 |